April 5, 1966  C. P. GRAVENOR ETAL  3,244,512
HYDROMETALLURGICAL IRON PROCESS
Filed July 1, 1963
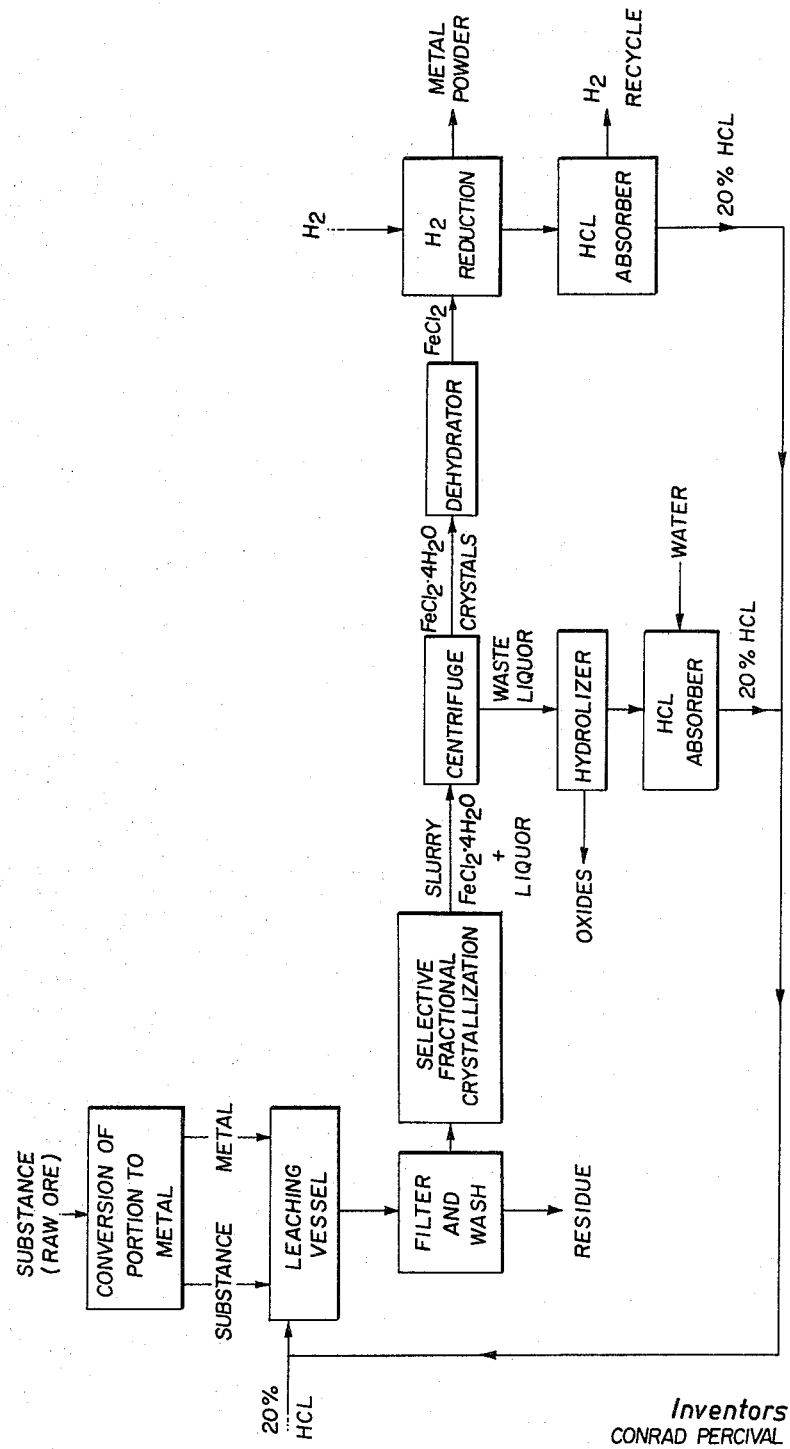
Inventors
CONRAD PERCIVAL GRAVENOR
TYSON RIGG
GERALD JAMES GOVETT
by: Cavanagh & Norman United States Patent Office 3,244,512
Patented Apr. 5, 1966

3,244,512
HYDROMETALLURGICAL IRON PROCESS
Conrad Percival Gravenor, Gerald James Govett, and Tyson Rigg, Edmonton, Alberta, Canada, assignors to The Research Council of Alberta, Edmonton, Alberta, Canada
Filed July 1, 1963, Ser. No. 291,909
Claims priority, application Great Britain, Mar. 4, 1963, 8,544/63
5 Claims. (Cl. 75—111)

This invention relates to improvements in hydrometallurgical processes for the selectable extraction of a metal such as iron from metal compound containing substances and materials.

The leaching of a metal from a mineral has been practiced heretofore in laboratory and pigment production techniques, where an oxide or other metal compound is precipitated out from the leach liquor or the liquor is concentrated such as by evaporation boiling or the like to effect the crystallizing out of a metal compound. The reduction of metal compounds thus obtained to metallic form by utilizing a reducing gas such as carbon monoxide or hydrogen is known in the production of metal powders. Such methods have never been wholly integrated as a continuous process and while volumes of metal powder have been made by chemical techniques the direct hydrometallurgical, effectively sulphur free, extraction of metals from minerals and mineral-like substances has remained unpracticed. One commercial attempt of recent years involved the conversion of a selected mineral to a metal compound in the gaseous phase from which it was condensed by distillation in direct metallic form under conditions of somewhat difficult control and of low volume of product. Thus the direct extraction of metals and especially of iron in large quantity from iron minerals and iron compound containing substances such as natural earths and the like on a commercial scale as a source of iron metal comparable to that provided by blast furnace and other pyrometallurgical techniques may be said to be heretofore unknown in commercial practice. The problem and cost of the beneficiation of many iron ores and other low grade ores to render them useful for pyrometallurgical processing is sufficient to render extensive mineral deposits useless for economic exploitation.

The hydrometallurgical extraction of metals and especially iron from mineral and iron bearing substances is set forth in United States patent application filed October 16, 1962, Serial No. 230,935, by the owner of this application.

Said prior application discloses a method and apparatus for the extraction of metals from substances by an extraction process which does not require beneficiation of the substances or ores operated upon either in the same way or to the same degree as pyrometallurgical processes and which is adapted selectively to deliver a direct metal product in large volume from mineral ores and low grade substances. Further, said prior application discloses the selective extraction of a metal of high purity and effectively free of sulphur, phosphorous, arsenic and other contaminants, from a mineral or other metal or metal compound containing substance or substances by first preparing the substance to render the desired metal containing components thereof soluble in hydrochloric acid, leaching said components into solution with liquid aqueous hydrochloric acid, selectively crystallizing out at least one metal chloride to crystalline form, dehydrating to metal chloride crystals, reducing the dehydrated crystals to metallic form thus to obtain the direct metal product and recover hydrochloric acid, and hydrolyzing the mother liquor from the metal chloride crystallizing step to recover the remainder of the hydrochloric acid and form oxides of other metals.

In the process described in said application all of the ore to be processed was dissolved, following pre-treatment, such as a reducing-roast, in hydrochloric acid. The composition of the liquors and the physical condition of the insoluble residue have since been found in some cases to be dependent upon the mineralogy and composition of the original ore. Some ores, such as some ores of oolitic type, have been found to generate a gelatinous floc during and following the hydrochloric acid leaching step. In some instances the floc occurs as a slimy residue and renders difficult the filtering of the residue to recover chlorides from the filter cake formed at the filtering stage. The rate of reaction during the leaching stage is, therefore, somewhat variable with the composition of the ore being processed.

It is accordingly a main object of this invention to improve the chloride recovery from the filter cake in a hydrometallurgical process of the kind described in said prior application.

It is a further object of this invention to substantially obviate the formation of silica floc or slime in the insoluble residue during the leaching stage of a hydrometallurgical iron extracting process using hydrochloric acid.

It is a further object of this invention to increase the over-all efficiency of iron extraction in ores which are prone to form the aforementioned gelatinous floc on dissolution of the roasted reduced product in hydrochloric acid.

It is a further object of this invention to reduce the capital and operating cost of the roasting reducing step by obviating the necessity of so roasting the entire ore.

It is a further object of this invention to convert a portion of the metal containing minerals in the ore or substances to be processed to the metallic state and to introduce this material into the leach liquor obtained by leaching the remaining portion of the raw ore with hydrochloric acid; in this particular example, it is an object of the invention to cause sufficient conversion to metallic iron to ensure that when added to a leach solution of the raw ore, the resultant liquor is substantially in the ferrous state, wherein the amount of metallized ore required depends upon the degree of metallization attained and the ferrous-ferric ratio of the raw ore.

With the foregoing and other objects in view the invention generally concerns a hydrometallurgical method for removing iron from iron composition containing substances wherein a portion at least of said substances is subjected to a relatively mild reducing roast. The roasted composition containing substances, that is, the ore or other material being processed, is combined with a ferrous-ferric leachate obtained from an aqueous hydrochloric acid leach on the raw-ore to provide ferrous chloride in solution and residue solids. This procedure results in an improvement in the overall efficiency of leaching and substantially obviates the formation of slime and floc. The leached substances are then filtered and separated from an effectively clean residue, the latter containing some metal values other than iron and residue waste substances. The ferrous chloride containing liquor is then subjected to selective crystallization to obtain ferrous chloride crystals which are then centrifuged or otherwise separated from the mother liquor, dehydrated and reduced to metallic form in such manner as to reclaim hydrogen chloride for recycling to the leaching stage.

Other objects of the invention will be apparent from a study of the following specification taken in conjunction with the accompanying flow sheet drawing.

Some ores give rise to the aforementioned difficulties in filtering which can be avoided according to this invention by achieving a very high degree of metallization (preferably greater than 65 percent metallization). Whereas this latter procedure is workable, the cost of reducing step is considerably increased: accordingly it is preferred herein to cause a high metallization (preferably greater than 80 percent metallization) on only a portion at least of the ore; this portion is then added to a substantially acid-free slurry of ore dissolved in aqueous hydrochloric acid in such proportions that the resultant chloride slurry is substantially in the ferrous state according to the reactions set out elsewhere in this application. Thus the process herein may be operated as hereinafter described in more detail by way of preferred practice.

Stage 1.—Ore preparation and roasting

Referring to the drawing a portion of the ore is ground, if necessary, to some suitable size and is then reduced by lignite, peat, wood, bituminous coals, natural gas or hydrogen or other methods, as for example, set out in said prior application at a temperature preferably about 1000° C. in any suitable apparatus such as multiple hearth kiln, rotary kiln, or fluid bed. Thus for example, low rank coal and ore may be ground to minus ¼ inch and charged to an internally gas-fired rotary kiln and roasted for about three hours at about 950° C.; the coal (now coke) is removed from the reduced material by magnetic separation and recycled to the next charge with a small amount of fresh coal. The product from the latter procedure will contain about 55 percent total iron of which 80 to 85 percent will be in the metallic form.

If all of the ore is roasted as in said prior application, the metal content of the roasted material is not critical provided that the resultant solution is essentially in the ferrous state when the entire roasted product is dissolved in aqueous hydrochloric acid. In the present modified procedure where only a portion of the ore is given a reducing roast as herein described, it is desirable to have as high a metallization as practical in the roasted portion.

Stage 2.—Leaching

As indicated above there are two ways of producing ferrous solutions; according to this invention the first is to roast all of the ore and then dissolve in acid, and the second is to roast a portion of the ore and add this material to a solution produced from the dissolution of raw ore. As these two ways differ in the leaching and filtering stages they are described separately.

Thus according to one way of practicing this invention all of the material to be processed is roasted and the roasted iron composition containing substance or ore is added to aqueous hydrochloric acid (preferably but not essentially in the range of 20 to 31 percent HCl) and the soluble material thereof dissolved. The reaction is quite vigorous and exothermic, the temperature of the solution rising to about 100° C. Dissolution is virtually complete after 30 minutes and the slurry is then ready for filtering. Iron recovered through dissolution varies between 75 and 99 percent, depending upon the ore and roasting treatment. In the case of Peace River ore, recovery by the process described herein is 82 to 85 percent of the iron in the ore.

In Stage 1 any sulphur compounds in the original ore and coal are converted to sulphides. In the dissolving stage the sulphides are attached and $H_2S$ is given off. Similarly arsenic is removed from the system as arsine. Thus two important deleterious constituents are eliminated in the dissolving stage.

The main constituent of the off-gases from the dissolving stage is hydrogen which is the result of the metallic iron dissolving in the acid. Other constituents in the off-gas include methane, CO and $CO_2$; an analysis of the off-gas from a typical dissolution is given in Table 1.

TABLE 1

*Off-gas analysis*

| Constituent: | Percent v./v. |
|---|---|
| H | 82 |
| $CO_2$ | 11.6 |
| CO (i.e. gases absorbed by cuprammonium liquor) | 2.8 |
| $CH_4$ | 2.4 |
| $H_2S$ | 1.2 |
| $AsH_3$ | 0.1 |

Roasting conditions are quite critical with respect to any alumina-silicates in the ore which, under certain conditions, are acid-soluble: this leads to considerable difficulty in filtering since the silica rapidly polymerizes and condenses to form a floc and, inasmuch as the aluminum remains in solution as aluminum chloride, less iron can be recovered by fractional crystallization; in general, the higher the metallization of the roasted product, the less acid-soluble the alumina-silicates become.

Near the end of the dissolution stage some water is added to the solution to prevent premature crystallization of iron chloride but principally to improve the filtering characteristics of the solution.

According to another and preferred way of practicing this invention at least a portion only of the raw ore is given a reducing roast as described in Stage 1 and this highly metallized material is then added to the dissolved unroasted ore in solution in the correct proportion to give an over-all ferrous chloride solution. The reaction is essentially as follows:

$$Fe + 2FeCl \rightarrow 3FeCl_2$$

It is likely—to some extent at least—that the following reactions occur with small amounts of free acid present:

$$Fe + 2HCl \rightarrow FeCl_2 + HCl$$
$$FeCl_3 + H \rightarrow FeCl_2 + HCl$$
$$2H \rightarrow H_2$$

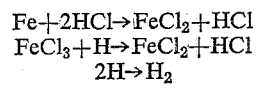

The amount of roasted ore to be added to the dissolved raw ore depends upon the ferric-ferrous content of the raw ore and the amount of metallic iron in the roasted ore.

The course of the reduction roast reaction on the prepared ore leachate may be followed by means of the redox potential. This can be done effectively in an arbitrary manner by immersing a platinum and a calomel electrode in the reaction mixture and measuring the E.M.F. developed. The E.M.F. increases slightly with decrease in total iron content and with decrease in acidity.

Thus, a slurry of raw Peace River (Province of Alberta, Canada) iron ore in hydrochloric acid had an E.M.F. of 476 millivolts indicating the about 70% of the iron in solution was in the ferric state. Addition of roasted ore containing an amount of metallic iron equal to one-half of the ferric content of the slurry brought about a substantially complete reduction in 20 minutes. The E.M.F. was then 305 millivolts, the iron content being 12 g./100 ml. and the free acidity 0.3 N.

An advantage of this preferred method of leaching is that it enables advantage to be taken of the partly reduced nature of the ore. At the same time, "over-reduction" is avoided with a corresponding increase in efficiency. Over-reduction occurs when all the ore is subjected to a reducing roast instead of just part of it. This results in the evolution of considerable amounts of hydrogen in the leaching process and is preferably to be avoided.

Under these conditions the recovery of the iron in the Clear Hills ore is more favourable by the preferred method herein by which recoveries as high as 95 percent have been achieved. Moreover, this preferred procedure overcomes the problems associated with dissolution of alumina-silicates provided that the quantities of acid are controlled to the concentration and amounts preferred or the effective equivalent thereof. A further advantage of this procedure is that "constant boiling" hydrochloric acid may be used, with consequent savings in equipment costs and simpler acid-recovery procedures.

Stage 3.—Filtering

The slurry obtained from Stage 2 is filtered on a rotary drum filter or other suitable apparatus in order to separate the ferrous chloride liquor from the insoluble impurities (primarily silica). The residue must be thoroughly washed and in some cases repulped in order to remove virtually all of the chlorides from the residue. In practice it is desirable to obtain an economic balance between the cost of evaporating the wash water and the cost of replacing the chloride by make-up acid.

Actual losses in single stage filtration found in pilot plant tests are less than 0.4 percent HCl of the total acid added and less than 0.53 percent of the soluble iron. It may be noted that unless steps are taken to avoid the dissolution of alumina-silicates such as by the preferred leaching procedure as much as 20 percent of the iron may be lost as soluble chloride in the filter cake.

The leachate which is now ready for evaporation is a complex chloride solution of analysis shown in Table II by way of example only

TABLE II

*Analysis of leachate.—General method*

| Constituent | All Ore Roasted and Made into Leachate | Preferred Method Portion Only of Ore Roasted and Added to Leachate of Un-roasted Ore |
|---|---|---|
| Fe | 12.2 | 11.5 |
| $SiO_2$ | 0.07 | 0.035 |
| $Al_2O_3$ | 1.95 | 1.57 |
| $TiO_2$ | 0.007 | .005 |
| $P_2O_5$ | 0.41 | 0.32 |
| $V_2O_5$ | 0.02 | 0.042 |
| CaO | 0.67 | 0.51 |
| MgO | 0.19 | 0.18 |
| $Na_2O$ | 0.03 | 0.03 |
| $K_2O$ | 0.019 | 0.018 |
| MnO | 0.002 | 0.003 |
| Free HCl | 5.0 | 0.2 |

Stage 4.—Evaporation and crystallization

The leachate from Stage 3 is evaporated to the point where the solutiion is saturated with respect to ferrous chloride. The saturated solution is then fed according to the invention into a continuous fractional crystallizer where $FeCl_2 \cdot 4H_2O$ crystals form. The amount of ferrous chloride which can be removed from the solution is, of course, dependent upon the amount and type of other impurities present. Using solutions obtained from the Clear Hills ore it is possible to remove between 85 and 90 percent of the iron from the solutions and still obtain a very pure iron chloride crystal.

The slurry of crystals and mother liquor is fed into a continuous centrifuge or other suitable separating apparatus and the ferrous chloride crystals thus separating from the liquor. The crystals can be lightly washed at this stage to remove surface impurities from the crystals. An analysis of the crystals is given in Table III.

TABLE III

*Analysis of ferrous chloride crystals (percent)*

| | |
|---|---|
| Fe (calculated as $Fe_2O_3$) | 42.6 |
| $Al_2O_3$ | 0.23 |
| $SiO_2$ | 0.05 |
| $TiO_2$ | 0.00 |
| $P_2O_5$ | 0.025 |
| CaO | 0.01 |
| MgO | 0.01 |
| $Na_2O$ | 0.001 |
| $K_2O$ | Trace |
| MnO | Trace |
| $V_2O_5$ | Trace |
| S | 0.001 |

Whereas the above described ferrous chloride crystals will yield substantially pure iron when reduced, it may be desirable for certain purposes to produce ferrous chloride which will yield iron of the order of 99.9 percent purity. This may be achieved by dissolving the ferrous chloride crystals, after separation from the mother liquor, in water or very dilute hydrochloric acid and recrystallizing the resultant solution, separating the crystals from the new mother liquor and lightly washing the crystals as described above.

Stage 5.—Hydrolysis of waste liquor

The mother liquor removed from the ferrous chloride crystals may be rich in other chlorides. In order to make the process more economic the other chlorides may be recovered and recycled in the system. This is achieved by hydrolysis in an Aman-type reactor. Of the chlorides present in solution, iron, aluminum and magnesium hydrolyze readily at moderate temperatures. The remaining major constituent, calcium, will react with alumina or phosphate to provide a calcium compound and HCl. Thus at temperatures of about 600° C. effectively all of the HCl can be recovered via hydrolytic or displacement processes of the type (a) hydrolysis:

$$2AlCl_3 + 3H_2O \rightarrow Al_2O_3 + 6HCl$$

(b) displacement:

$$3CaCl_2 + 2H_3PO_4 \rightarrow Ca_3(PO_4)_2 + 6HCl$$

Stage 6.—Drying and reduction of ferrous chloride

The tetrahydrate ferrous chloride crystals from Stage 4 preferably should be dried before reduction of the chloride to iron. It is not necessary to eliminate all the water from the crystals but only sufficient so that a free-flowing solid is obtained. It has been found that the tetrahydrate can be dehydrated to the dihydrate state with little difficulty in a Raymond dryer. If further drying below the dehydrate state is attempted it is found that excessive amounts of oxide may be formed unless an atmosphere of hydrogen or hydrogen chloride is used.

In the final stage of the process herein the iron chloride is preferably reduced with hydrogen according to the equation:

$$FeCl_2 + H_2 \rightarrow Fe + 2HCl (+37.4K \text{ cal.})$$

Theoretically the reaction starts at about 325° C. and at the melting point of ferrous chloride (673° C.) the equilibrium gas composition is 17 percent HCl. In practical plant operation only about 10 percent of the gas leaving the reactor may be expected to be HCl; therefore it is necessary to recycle the hydrogen after absorption of the HCl. Under some circumstances, it may be desirable according to the invention to hydrolyze the ferrous chloride completely to oxide, and reduce the oxide to metallic iron. Whereas this alternative has certain advantages with respect to better chemical equilibrium the hydrogen requirements are higher, and the likelihood of making a pyrophoric product is much greater, thus giving rise to cost and handling problems not otherwise encountered by preferred practice herein.

The actual reduction step in the process of this invention has been accomplished in static bed, travelling bed, multiple hearth kiln and in fluid beds. Although fluid bed reduction is very desirable from several standpoints it has been found that the iron tends to agglomerate in the region of 600° C. and the bed may defluidize. At temperatures below 580° C. the extent of reaction is low.

Table IV gives the composition of a typical iron product.

TABLE IV

| Composition of iron powder: | Percent |
|---|---|
| Fe | 99.2 |
| P | 0.05 |
| S | 0.005 |
| C | 0.03 |
| $SiO_2$ | 0.17 |
| $Al_2O_3$ | 0.75 |
| $TiO_2$ | 0.01 |
| CaO | 0.02 |
| MgO | 0.03 |
| $Na_2O$ | 0.003 |
| $K_2O$ | 0.003 |
| MnO | 0.013 |
| $V_2O_5$—Trace. | |

It will be evident from the foregoing that the improved process herein effects a modification of the preparation of the raw ore in the preparation of the leachate. Raw crushed ore is dissolved in hydrochloric acid and, according to this invention, partially reduced ore which has been subjected to a reduction roast is additionally added to the dissolved raw ore in proportions to give an overall ferrous chloride solution.

In the case of Alberta Clear Hills ore it has been found that dissolving of the raw ore and the reduction of the ferric chloride by addition of roasted product are both reasonably fast reactions.

(1) In practice it has been found that overall iron recovery from the ore is higher than that experienced by the process of said prior patent application.

(2) The insoluble residue is a granular solid and little evidence of silica floc or slime has been noted. This results in better chloride recovery from the filter cake and much better filtering characteristics.

(3) The size of the roasting equipment can be reduced.

(4) Use of weaker acid (e.g. constant boiling mixture) is possible. This is an advantage from the standpoint of equipment and recovery of the acid.

By dissolving the raw ore in acid according to this invention while providing for the presence of reduced ore in the chloride solution a granular residue is obtained. This residue forms a good filter cake and is washed readily. Apparently very little silica is taken into solution by the method and process herein and hence many problems of prior hydrometallurgical practice are overcome.

In the same sense the invention concerns in the residence of its preferred process technique a hydrometallurgical method for selectively removing iron from iron ore comprising: grinding said ore if necessary; roasting at least a portion only of said ground ore in a reducing atmosphere to convert a substantial portion of the iron content thereof to metallic iron; leaching said roasted ore in a ferric-ferrous leachate (obtained from dissolving a portion of the ore in aqueous hydrochloric acid), to react at least the metallic iron therein with ferric chloride to produce an over-all ferrous chloride solution; filtering said leached ore to separate the chloride containing liquor and solids; selectively crystallizing from said liquor iron chloride in crystalline form; withdrawing the liquor from said crystals and hydrolyzing said liquor to obtain hydrogen chloride gas and metal oxides or non-crystallized chlorides; adding water to said hydrogen chloride gas and recycling same for leaching of said substances; heating said iron chloride in the presence of a reducing gas at less than melting temperature thereof to reduce the same to metallic form and to generate hydrochloric acid gas; and recycling said acid gas in water to leaching of said substances.

What we claim is:

1. A hydrometallurgical method for selectively removing iron from iron compound containing substances comprising: converting a portion of an iron compound in said substances to metallic form; leaching said substances including the converted portion thereof in aqueous hydrochloric acid to dissolve at least the iron of said portion thereof and the corresponding compound of said iron on said substances to form iron chlorides in solution; filtering said chlorides in solution to separate the solids not in solution therefrom; selectively crystallizing from said chlorides in solution, chloride crystals of the thus selected iron; withdrawing the liquor containing any other chlorides in solution from said crystals; and converting said iron chloride crystals to metallic form in the presence of hydrogen at less than melting temperature of said metal while heating said chloride crystals to less than melting temperature thereof.

2. The method as claimed in claim 1 in which the said portion of the iron compounds in said substances is converted to a metallic form by roasting a separate portion of said substances in a reducing atmosphere.

3. The method as claimed in claim 1 in which the said portion of an iron compound in said substances is converted to metallic form by roasting a separate portion of said substances in a reducing atmosphere; and in which said substances are leached by first introducing unconverted substances to aqueous hydrochloric acid and adding thereto the converted portion of said substances.

4. A hydrometallurgical method of selectively removing iron from iron compound containing substances comprising: subjecting a portion of said substances to a reducing atmosphere to effect substantial reduction of the iron compounds therein to metallic iron; dissolving the other portion of the substances in aqueous hydrochloric acid to provide a ferric-ferrous leachate; leaching said reduced portion of said substances in said leachate to react at least the metallic iron thereof with ferric chloride in said leachate thus to provide a substantially ferrous chloride in solution; selectively crystallizing ferrous chloride crystals from said ferrous chloride in solution and reducing said ferrous chloride crystals to metallic form in hydrogen while heating said chloride crystals to less than melting temperature thereof.

5. A hydrometallurgical method for selectively removing iron from iron compound containing substances comprising: leaching said substances in aqueous hydrochloric acid to dissolve iron compounds therein and to provide a slurry having ferric chloride in solution; adding metallic iron to said slurry in an amount substantially equal to one half the ferric content thereof to change the ferric chloride in solution to ferrous chloride; filtering the ferrous chloride in solution from said slurry to separate solids therefrom; selectively crystallizing ferrous chloride crystals from said ferrous chloride in solution; and reducing said ferrous chloride crystals to metallic form in the presence of hydrogen while heating said chloride crystals to less than melting temperature thereof.

References Cited by the Examiner

UNITED STATES PATENTS

| 125,464 | 4/1872 | Larkin | 75—121 |
| 2,045,092 | 6/1936 | Mitchell | 75—111 |
| 2,290,843 | 7/1942 | Kinney | 23—87 |
| 2,418,148 | 4/1947 | Williams | 75—91 |
| 2,424,351 | 7/1947 | Chistensen | 75—114 |
| 2,762,700 | 9/1956 | Brooks | 75—0.55 |
| 2,766,115 | 10/1956 | Graham | 75—114 |
| 2,818,328 | 12/1957 | Francis | 75—0.55 |
| 2,903,341 | 5/1959 | Pike | 23—87 |

FOREIGN PATENTS

| 793,700 | 4/1958 | Great Britain. |
| 896,893 | 5/1962 | Great Britain. |

HYLAND BIZOT, *Primary Examiner.*

DAVID L. RECK, BENJAMIN HENKIN, *Examiners.*

H. W. CUMMINGS, N. F. MARKVA,
*Assistant Examiners.*